(12) United States Patent
Makey

(10) Patent No.: US 12,521,145 B2
(45) Date of Patent: Jan. 13, 2026

(54) SPECIMEN RETRIEVAL DEVICE

(71) Applicant: Board of Regents, The University of Texas System, Austin, TX (US)

(72) Inventor: Ian Makey, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 305 days.

(21) Appl. No.: 18/018,512

(22) PCT Filed: Jul. 28, 2021

(86) PCT No.: PCT/US2021/043380
§ 371 (c)(1),
(2) Date: Jan. 27, 2023

(87) PCT Pub. No.: WO2022/026501
PCT Pub. Date: Feb. 3, 2022

(65) Prior Publication Data
US 2023/0301681 A1    Sep. 28, 2023

Related U.S. Application Data

(60) Provisional application No. 63/189,388, filed on May 17, 2021, provisional application No. 63/057,511, filed on Jul. 28, 2020.

(51) Int. Cl.
*A61B 17/34* (2006.01)
*A61B 17/00* (2006.01)

(52) U.S. Cl.
CPC .... *A61B 17/3431* (2013.01); *A61B 17/00234* (2013.01); *A61B 17/3423* (2013.01); *A61B 2017/00287* (2013.01)

(58) Field of Classification Search
CPC .......... A61B 17/3205; A61B 17/00234; A61B 17/3431; A61B 17/3423; A61B 17/221;
(Continued)

(56) References Cited

U.S. PATENT DOCUMENTS 5,195,507 A    3/1993   Bilweis
5,593,413 A    1/1997   Alexander
(Continued)

FOREIGN PATENT DOCUMENTS

CN       210277284       4/2020
WO     WO2019049152      3/2019
WO     WO2022026501      2/2022

OTHER PUBLICATIONS

International Search Report and Written Opinion issued in corresponding International Application No. PCT/US2021/043380 mailed on Nov. 5, 2021.

*Primary Examiner* — Ellen C Hammond

(57) ABSTRACT

Disclosed is a specimen retrieval device that utilizes a constricting mesh to assist with the contained retrieval of specimens during minimally invasive surgical procedures. The device can facilitate isolation and removal of specimens and allows the specimen to be removed through a smaller incision than a traditional extraction bag through constricting and elongating of the specimen by tension provided from pulling the specimen retrieval device and activating the inner woven fibers. The two-hole opening allows for optimal specimen orientation. In certain aspects the device is configured to disperse pulling tension over a larger area reducing the likelihood of specimen tearing during removal. Large specimens are safely reduced to an easily removable size and shape.

20 Claims, 5 Drawing Sheets

(58) Field of Classification Search
CPC .... A61B 17/22031; A61B 2017/00287; A61B 2017/22034; A61B 2017/22035; A61B 2017/3429; A61B 10/02
See application file for complete search history.

(56) References Cited

U.S. PATENT DOCUMENTS

| | | |
|---|---|---|
| 5,735,289 A | 4/1998 | Pfeffer et al. |
| 2002/0137988 A1 | 9/2002 | Shipp et al. |
| 2011/0152920 A1 | 6/2011 | Eckhouse et al. |
| 2011/0299799 A1 | 12/2011 | Towe |
| 2017/0181767 A1 | 6/2017 | Makey |
| 2017/0245839 A1 | 8/2017 | Malkowski |
| 2017/0252026 A1 | 9/2017 | Gupta et al. |
| 2019/0336152 A1 | 11/2019 | Ahluwalia et al. |
| 2020/0093469 A1 | 3/2020 | Do et al. |

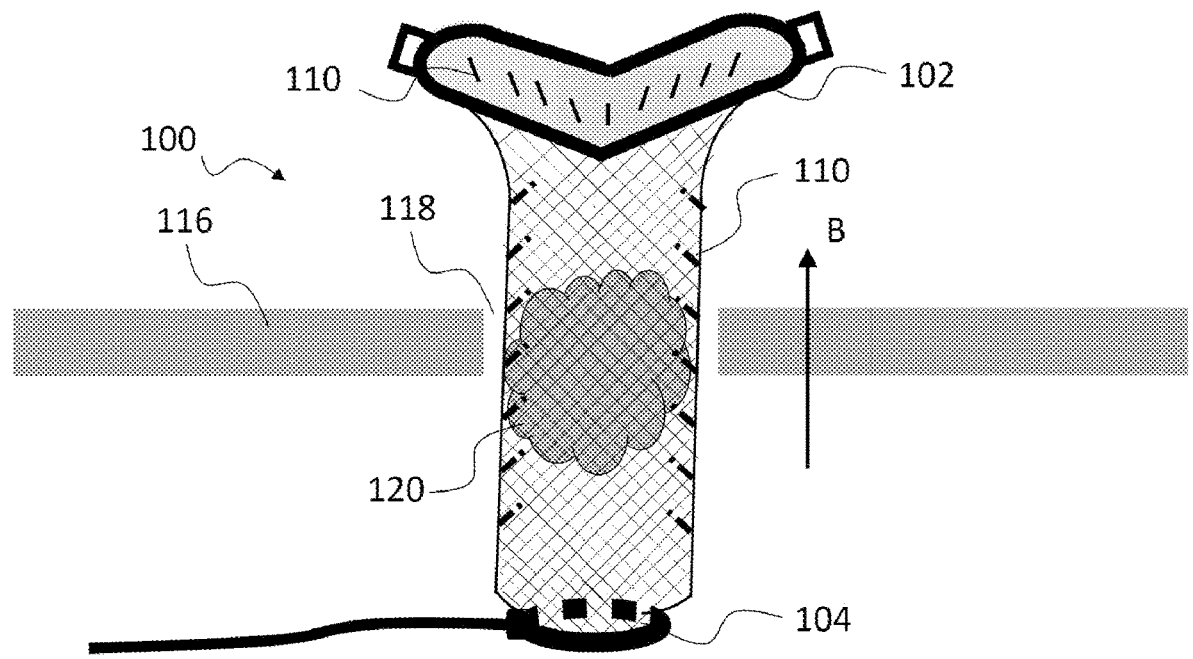
FIG. 1D
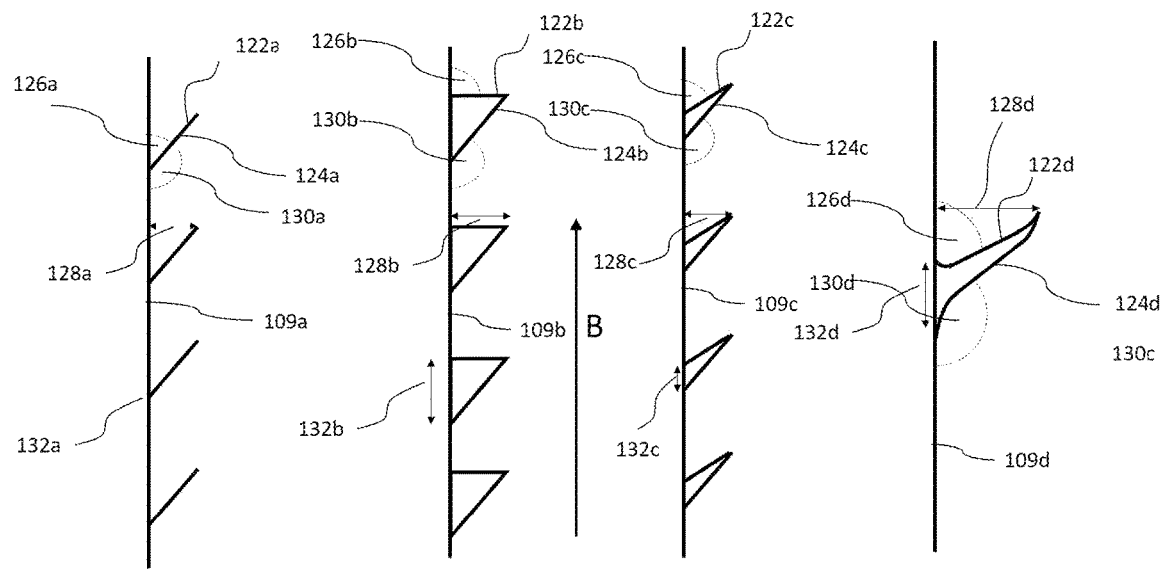
FIG. 2A     FIG. 2B     FIG. 2C     FIG. 2D

SPECIMEN RETRIEVAL DEVICE

PRIORITY PARAGRAPH

This Application is a 371 national stage filing of and claims priority to PCT application serial number PCT/US2021/043380 filed Jul. 28, 2021 which claims priority to U.S. Provisional Applications 63/057,511 filed Jul. 28, 2020 and 63/189,388 filed May 17, 2021, each of which are incorporated herein by reference in their entirety.

STATEMENT REGARDING FEDERALLY FUNDED RESEARCH

None

BACKGROUND

The field of minimally invasive surgery has become commonplace. Large specimens are being resected using minimally invasive techniques. The limitation to removing these larger specimens is the port size. The current method to remove a specimen is to put it into a laparoscopic specimen retrieval bag and withdraw it from the body cavity. This method of extraction causes the specimen to bunch at the bottom of the bag. Extra force or a larger hole is required to complete extraction. There is a need for additional devices for removing a specimen from a body cavity.

SUMMARY

Certain embodiments are directed to a specimen retrieval device. The specimen retrieval device constricts relative to the short axis dimension as the device or a portion of the device is elongated. This constriction minimizes the specimen profile and allows efficient removal of the specimen. The specimen retrieval device can remove surgical specimens through smaller incisions than the current standard of care. The device can have one or two openings allowing for optimal specimen orientation. The device can contain an intra woven mesh structure or braid, e.g., sleeve. The mesh or braid structure provides two configurations dilated and contracted. The device can have a directionally resistant high friction wall capable of reducing slippage of the specimen during removal. The specimen can be moved into the sleeve while the wall impedes movement of the specimen in the opposite direction out of the entrance port of the sleeve. The device can include impermeable walls or layers and a cinching mechanism capable to create a waterproof encapsulating device. In certain embodiments the sleeve is deployed having two opening that can be closed to contain the specimen. In other embodiments the sleeve can have one opening that can be closed to contain a specimen, a bag-like configuration. The various embodiments maintain the capability to manage the specimen profile by manipulating the woven mesh structure and facilitating removal of the specimen from the body cavity.

The specimen retrieval device can contain a proximal opening and a distal opening (alternatively a distal opening), a flexible elongated body or sleeve extending from the proximal opening to the distal opening, a contractible tubular interwoven mesh or braid structure extending from the proximal opening to the distal opening and optionally, a plurality of surface protrusions (the surface protrusions being located on the inner surface of the sleeve).

The proximal opening can be configured to be positioned proximal and external to an opening in a subject's body wall. In some aspects, the proximal opening can be a foldable ring or section of foldable material to form a loop. The can be configured to receive other instruments such as handles. The foldable ring can have hinges or like devices and/or mechanisms allowing the ring to fold or unfold, or otherwise be closed. In some aspects, the foldable proximal ring can fold or unfold over or along an axis perpendicular to the long axis of the device. In some aspects, the proximal opening ring can have handles attached to it. The proximal opening ring is capable of and can be configured for securing the device outside of the body wall. The proximal opening also provides pull point(s) for contracting the sleeve diameter, removing a specimen positioned in the device, and/or removing the device. In certain aspects, the pull point is independent of the handle and allows the sleeve or body (containing a secured specimen) of the device to be removed while the handle portion remains in place. The specimen manipulating portion can be removable position in an access body or tube that deployed external to the specimen removal device. In certain aspects the ring can be formed by folding the mesh to create a ring or loop having a lumen that a handle or other device can be inserted into. The ring can be formed by folding the terminal portion of the sleeve over onto itself. In certain aspects, the entire specimen removal device can be introduce into the body cavity, and thus the external portions being optional for certain embodiments.

The distal opening can be at an end of the device opposite to the proximal opening or a closed end of the sleeve. In some aspects, the distal, proximal, or distal and proximal opening(s) can be a flexible or inflatable ring capable of changing diameter (particularly inner diameter) or being closed (minimizing the inner diameter of the opening, e.g., cinching the opening). The device can include a mechanism such as a lock or cinch or inflatable ring capable of changing the inner diameter of the distal, proximal, or distal and proximal opening(s). The diameter of the distal, proximal, or distal and proximal opening can be reduced and the distal, proximal, or distal and proximal opening(s) can be closed in order to contain essentially all of or all of the contents of the specimen during extraction. In some aspects, the lock can be a cinch lock, a drawstring, a snap, a clip, hook and loop (e.g., VELCRO™), zipper, a zip lock, a slide lock, a lock with interlocking edges (e.g., male/female compliment) or the like. In some aspects, the distal, proximal, or distal and proximal opening ring(s) forms a water tight seal in the cavity of a subject prior to removal of the specimen. The seal can be designed to contain or substantially contain body fluids or debris that may be discharged from the specimen as it is manipulated, constricted, and/or squeezed, and withdrawn from the body. In some aspects, the lock can facilitate formation of the water tight seal. The proximal and distal opening can allow for optimal specimen orientation. In certain aspects, the distal opening can be closed prior to, during or after deployment forming a bag structure. In the instance of prior to deployment the sleeve is effectively a bag with the same constriction propertied of a sleeve configuration.

The flexible elongated body or sleeve can form a channel along a long axis of the device configured to traverse an opening in the body wall of the subject and can be configured to provide an access channel through which an instrument for specimen removal can be introduced into a body cavity. The flexible elongated body or sleeve can be or at least a portion of it can be transparent. The flexible elongated body or sleeve can be or at least a portion of it can be made with a first material comprising a flexible, foldable, and water impermeable material such as water impermeable plastic. The first material can be impermeable to body fluids, cells to prevent spillage during specimen extraction. In some aspects, the first material can be water impermeable, biocompatible, transparent plastic.

In some aspects, the elongated body or sleeve can be incorporated into the tubular interwoven mesh or braid structure and the mesh or braid structure and the elongated body can form a single layer, or the elongated body or sleeve can surround, or be surrounded by the mesh or braid structure, (similarly the mesh or braid structure can be surrounded by, or surrounds the elongated body or sleeve) and the elongated body or sleeve and the mesh or braided structure can form separate layers. In some aspects, the elongated body or sleeve can be incorporated into the mesh or braid structure by coating and/or adding the first material e.g. the impermeable material into or over the mesh or braid structure.

The contractible interwoven tubular mesh or braid structure can have two configurations dilated and contracted. The tubular mesh or braid structure can have a larger cross-sectional diameter along a transverse plain perpendicular to the long axis of the device in the dilated configuration compared to the cross-sectional diameter in the contracted configuration. As used herein cross-sectional diameter of the device, the elongated body or sleeve, the channel formed by the elongated body and the tubular mesh or braid refers to cross-sectional diameter of the respective parts along a transverse plain perpendicular to the long axis of the body. The dilated configuration and the contracted configuration can be interchangeable through changing the device and mesh or braid length, where the mesh or braid can change from dilated to contracted configuration by lengthening the device and mesh or braid, and the mesh or braid can change from contracted to dilated configuration by shortening the device and mesh or braid. In some aspects, the tubular mesh or braid in the dilated configuration can have a length of 0.01 to 5000 cm or at least any one of, equal to any one of, or between any two of 0.01, 0.05, 0.1, 1, 5, 10, 50, 100, 500, 1000, 2000, 3000, 4000 and 5000 cm and an average cross-sectional diameter of 0.01 to 1500 cm or at least any one of, equal to any one of, or between any two of 0.01, 0.05, 0.1, 1, 5, 10, 50, 100, 500, 1000 and 1500 cm. In some aspects, the tubular mesh or braid in the contracted configuration can have a length of 0.07 to 7000 cm or at least any one of, equal to any one of, or between any two of 0.07, 0.1, 1, 5, 10, 50, 100, 500, 1000, 2000, 3000, 4000, 5000, 6000 and 7000 cm and an average cross-sectional diameter of 0.005 to 1200 cm or at least any one of, equal to any one of, or between any two of 0.005, 0.01, 0.05, 0.1, 1, 5, 10, 50, 100, 500, 800, 1000 and 1200 cm. In general, the diameter and length of a dilated/contracted sleeve will be slightly larger than the dimensions of the specimen it is designed to encapsulate and remove from the body. The length and cross-sectional diameter of the channel formed by the elongated body can be dependent on the length and cross-sectional diameter of the tubular mesh or braid and vice versa. For example, the cross-sectional diameter of the channel can be reduced by reducing the cross-sectional diameter of the tubular mesh or braid which in turn can be done by lengthening the tubular mesh or braid. The mesh or braid structure and the device can also take configurations that are intermediate between the dilated and the contracted configuration, such as with cross sectional diameter bigger than the contracted but smaller than the dilated configuration. By changing the length of the device and the mesh or braid structure and the device can switch between configurations. Such change in channel diameter can compress a specimen in the channel thus allowing it to be removed through a smaller incision than a traditional extraction bag. The mesh or braid can be made of any suitable bio compatible material, e.g. a second material suitable for medical use. The second material can include but is not limited to, fabric, plastic, suture material, metals (e.g., flat or rounded wires) or any combinations thereof. In some particular aspects, mesh can be made of nylon, polyester, or polyolefin such as polyethylene and/or polypropylene, or any combinations thereof. The length of the tubular mesh or braid and the device can be changed by pulling or pushing at the proximal or distal, or proximal and distal openings, rolling the mesh and elongated body material over the proximal or distal opening ring, or folding or unfolding the proximal ring or any combinations thereof. In some aspects, the interwoven mesh can contain braids with individual strands/threads, such as 2 to 1000 individual strands/threads to achieve the desired length to contraction/constriction ratio needed for optimal specimen compression. In some aspects, the mesh can contain helical braids.

The plurality of surface protrusions can be positioned on an inner surface of the elongated body and/or the tubular mesh. In some aspects, the tubular mesh can surround the elongated body and the plurality of surface protrusions can be positioned on the inner surface of the elongated body. In some aspects, the tubular mesh can be surrounded by the elongated body and the plurality of surface protrusions can be positioned on the inner surface of the tubular mesh. In some aspects, the tubular mesh and the elongated body can form a single layer and the surface protrusions can be positioned on the inner surface of the single layer. The surface protrusions can form a high friction directionally resistant inner surface of the device, and the plurality of surface protrusions can be configured to contact a specimen from the subject's body pulled into the channel through the distal opening and is configured to allow movement of the specimen through the channel towards the proximal opening but resist movement of the specimen towards the distal opening. The plurality of surface protrusion and the tubular mesh such as in its contracted configuration can disperse pulling tension over a larger area reducing the likelihood of bunching of the surgical specimen during removal and specimen tearing during removal allowing removal of the specimen through a relatively smaller incisions. Inner surface of the elongated body and the tubular mesh can be surface of the respective parts that faces towards the inside of the device.

The surface protrusions can have a top edge that is proximal to the proximal opening and a bottom edge that can be proximal to the distal opening. The angle formed between the top edge and the surface on which the surface protrusion is positioned, e.g. inner surface of the elongated body and/or the mesh can be 90° or less. In some aspects, the angle formed between the top edge and the surface on which the surface protrusion is positioned can be 15° to 90° or equal to any one of, or between any two of 15, 20, 25, 30, 35, 40, 45, 50, 55, 60, 65, 70, 75, 80, 85 and 90°. The angle formed between the bottom edge and the surface on which the surface protrusion is positioned can be 90° or higher. In some aspects, the angle formed between the bottom edge and the surface on which the surface protrusion is positioned can be 100° to 170° or equal to any one of, or between any two of 100, 105, 110, 115, 120, 125, 130, 135, 140, 145, 150, 155, 160, 165 and 170°. The surface protrusions can be of any suitable shape capable of providing the directional specimen movement along the channel. In some aspects, the surface protrusions can be hair, needle, wedge, spike, barb, hook, and/or loop. In some aspects, the surface protrusions can be part of the elongated body and/or the mesh structure. In some aspects, the surface protrusions can be added or incorporated into the elongated body and/or the mesh structure by a separate element such as a barbed thread or suture.

The subject, subject's body parts, specimen from the subject are not part of the device.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a device and/or method that "comprises" a list of elements (e.g., components or features or steps) is not necessarily limited to only those elements (or components or features or steps), but may include other elements (or components or features or steps) not expressly listed or inherent to the device and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a chemical composition and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIGS. 1A-D show a device according to one embodiment. FIG. 1A shows the device and the tubular mesh structure in the dilated configuration. FIG. 1B shows the device and the tubular mesh structure in the contracted configuration. FIG. 1C shows the device and the tubular mesh structure in the contracted configuration and folding of the foldable proximal opening ring of the device. FIG. 1D shows the device inside a subject's body.

FIGS. 2A-D show side view of the surface protrusions according to four (4) examples, FIG. 2A hair or needle, FIG. 2B wedge, FIG. 2C spike or angled spike, and FIG. 2D bard or hook shaped surface protrusions, of the present invention.

FIG. 3A: For device 100 the mesh structure 108 surrounds the elongated body 106 and the surface protrusions 110 are positioned on the inner surface of the elongated body.

FIG. 3B: For device 200 the mesh structure 208 is surrounded by the elongated body 206 and the surface protrusions 210 are positioned on the inner surface of the mesh structure 208. FIG. 3C: For device 300 the elongated body is incorporated into the mesh structure forming a single layer 308 and the surface protrusions 310 are positioned on the inner surface of 308.

DETAILED DESCRIPTION

Figure 1A:
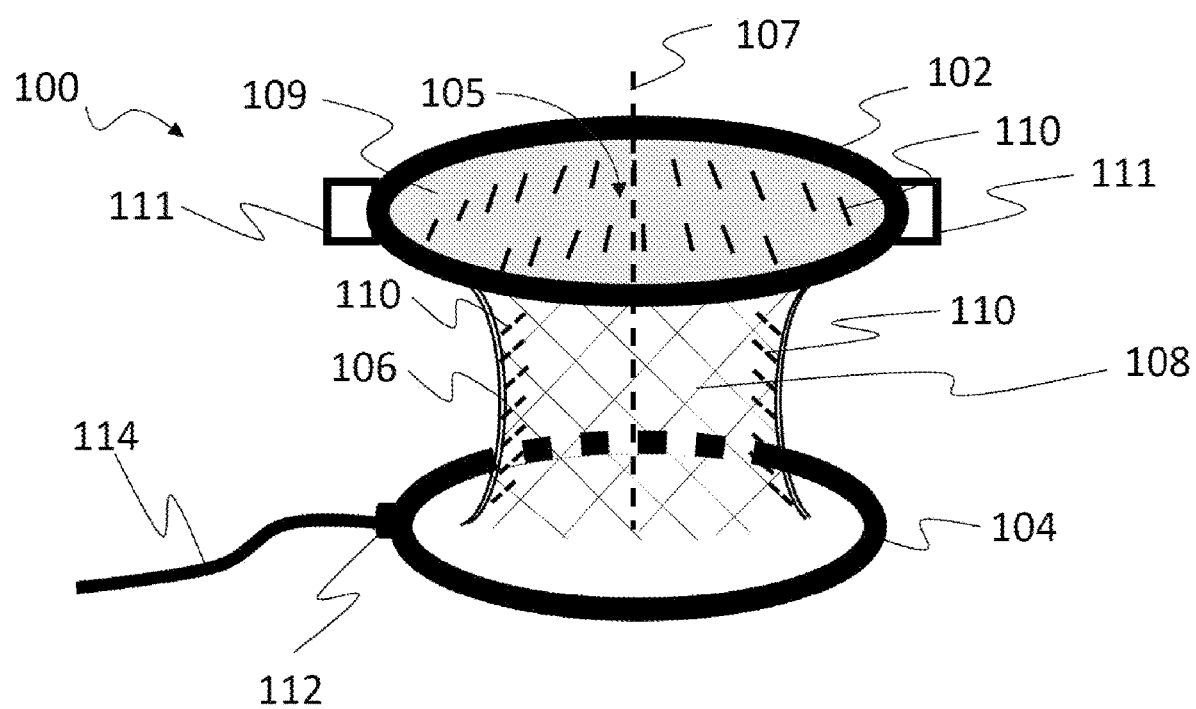

Referring to FIG. 1 a device according to one embodiment of the current invention is described. The device 100 can have a proximal opening 102, a distal opening 104, an elongated flexible body 106 extending from the proximal 102 to the distal opening 104 and forming a channel 105 along a long axis 107 of the device, and a contractible interwoven tubular mesh structure 108 extending from the proximal opening 102 to the distal opening 104 along the long axis 107. The contractible mesh structure can have diamond shaped, lateral, horizontal, or spiral weave. The tubular mesh structure can be coupled with an impermeable membrane that will restrict the movement of cells or pathological metabolites that may be associated with a tissue, organ, tumor, or other biological structure to be removed from a patient. The impermeable membrane can form the internal surface, external surface, or the internal and external surface of the tubular mesh. In certain aspects the impermeable membrane is a thin thermoplastic material. In certain aspects, the weave is such that a constricting force can be applied to the contents of the tubular mesh. The constricting force can horizontal, lateral, or horizontal and lateral. The constriction force can be generated by twisting or applying torsion to the body, proximal end, distal end, or proximal and distal end of the device. The constricting force can be used to shape the contents of the tubular mesh to aid in extraction. The elongated flexible body can have a proximal, distal, or proximal and distal sealing mechanism that seals contents in the body of the device and allows manipulation of the contents for shaping the contents for easier extraction. Sealing of both ends of the device or tubular mesh component converts channel 105 to a contents lumen or bag. The sealing mechanism can be a cinch, lasso, folding, stapling, zip-lock, hood, adhesive, clamp, thermal melt, chemical melt, or other sealing mechanism that prevent spillage of fluids or materials from the device.

Laparoscopic surgery requires carbon dioxide ($CO_2$) insufflation into the peritoneal (abdominal) cavity to create a space (pneumoperitoneum) for the surgeon to maneuver the camera and laparoscopic instruments. Since the extraction sleeve is a hollow cylinder, it will allow the $CO_2$ gas to escape. Therefore, in certain aspects, the device can include a valve located in the lumen of the cylinder to prevent escape of the pressured gas from the abdominal cavity. This valve allows the pneumatic pressure in the body cavity to be maintained. The valve can be two opposing leaflets similar to the valves on a laparoscopic trocar.

In device 100 the mesh structure 108 surrounds the elongated body 106 and 108 and 106 forms separate layers. In certain aspects, a unique identifier can be woven, printed, attached to the sleeve, providing for identification and cataloging among other things.

A plurality of surface protrusions 110 can be positioned on an inner surface 109 of the elongated body 106 forming a directionally resistant surface. The outer surface of the elongated body can contact the mesh structure 108. The proximal opening 102 can be a foldable ring. In some aspects, the proximal opening 102 ring can contain attachments 111, such as handles or like, for holding the ring 102 and device, and/or folding the ring. The distal opening 104 can be a flexible ring capable of changing diameter. The device can contain a lock 112 capable of changing the diameter of the distal opening ring. The lock can be a cinch lock, a drawstring, a snap, a clip, a zip lock, a slide lock, or a lock with interlocking edges.

In certain aspects the lock can be a cinch lock containing a lasso 114. The diameter of the distal opening ring 104 can be changed using the lock 112 and the lasso 114. The distal opening can form a seal, such as a water-tight seal in a cavity of a subject prior to removal of the specimen. The seal can be designed to contain body fluids and/or debris that may be discharged from the specimen as it is squeezed and withdrawn from the body. The distal opening 104 can be designed to act as a semi-rigid handle to facilitate moving the elongated body 106 over the specimen.

The tubular interwoven mesh structure can be a hollow tubular mesh with opposite ends of the tube opening at the proximal and distal opening. The tube can be a symmetrical or an asymmetrical tube. The cross-sectional diameter of the tube can remain same or change over the length of the tube. The cross-sectional diameter of the tube over the length of the tube can change symmetrically or asymmetrically/irregularly. The cross-sectional diameter of the tube at one end of the tube can be same, smaller or bigger than the opposite end of the tube. The cross-sectional diameter of the tube at middle portions of the tube can be same, smaller and/or bigger than that at the ends of the tube. Lengthening the tubular mesh structure can reduce the cross-sectional diameter, e.g. average cross-sectional diameter of the tube. In some aspects, the interwoven mesh structure can contain helical braids. In some aspects, the interwoven mesh structure 108 can contain braids with individual strands/threads, such as 2 to 1000 or 2, 10, 50, 100, 200, 300, 400, 500, 600, 700, 800, 900, or 1000 strands/threads including all values and ranges there between, to achieve the desired length to contraction/constriction ratio needed for optimal specimen compression. Certain embodiments employ design elements for expanding (e.g., the length of a specimen) and/or reducing size of specimen (e.g., width or diameter) by constricting the specimen when contained in the sleeve. The constriction can be applied mechanically by manipulating the interwoven mesh or hydraulically by inflating all or a portion of the sleeve to reduce or lengthen the size or inner diameter of the sleeve lumen.

In certain embodiments, the sleeve or body can incorporate inflatable tubes or pillars. The inflatable tubes or pillars are configured, in one embodiment, to allow for rigidity along the length of the cylinder to permit the specimen to be pulled into the sleeve cylinder more easily. In other aspects, a tube(s) or pillar(s) is/are included to provide stability or other structural support to the sleeve when needed. The tubes or pillars can be positioned internally, externally, or internally and externally with respect to the interwoven mesh structure. The tubes or pillars are hollow, closed tubes or bladders that can be inflated or deflated with a gas (nitrogen, air, etc.) or liquid (e.g., water, saline, etc.). There can be 1, 2, 3, 4, 5, 6, 7, 8, 9, 10 or more inflatable tubes or pillars. The tube(s) or pillar(s) can be positioned parallel to the long axis or the body, perpendicular to the long axis of the body, spiraling around the long axis of the body with a pitch of 1, 2, 3, 4, 5, 6, 7, 8, 9, or 10 mm or cm, including all values and ranges there between. The tubes or pillars can each individually be 0.01 to 5000 cm as measured along the long axis of the tube or pillar. Not all tubes or pillars need to be the same length or aligned (i.e., the tubes or pillars can be in an off-set configuration with respect to each other. The tubes or pillars can be configured to be inflated individually, or as a group or subgroup. In a particular aspect, the terminal tubes or pillars, be it proximal, distal, or proximal and distal can be inflated independent and occlude the distal, proximal, or distal and proximal openings of the sleeve or body.

The mesh structure can have a dilated configuration and a contracted configuration. FIG. 1 A shows the mesh structure and the device in the dilated configuration and FIG. 1 B shows the mesh structure and the device in the contracted configuration. The length of the mesh structure and the device can be shorter in the dilated configuration compared to that in the contracted configuration. Average cross-sectional diameter of the mesh structure and the device along transverse plains perpendicular to the long axis 107 can be bigger in dilated configuration compared to that in the contracted configuration. The mesh structure and the device can also take configurations that are intermediate between the dilated and the contracted configuration, such as with cross sectional diameter bigger than the contracted but smaller than the dilated configuration and length shorter than the contracted but longer than the dilated configuration. By changing the length of the device the mesh structure and the device can switch between configurations. The length of the device can be changed by pulling or pushing using the proximal 102 and/or distal 104 opening rings and/or rolling the edges of the mesh and the elongated body around the proximal 102 and distal 104 opening rings, or folding the foldable proximal ring 102 or any combinations thereof. Length and cross-sectional diameter of the channel 105 can increase or decrease with increase or decrease of the length and cross-sectional diameter respectively of the tubular mesh.

Figure 1B:
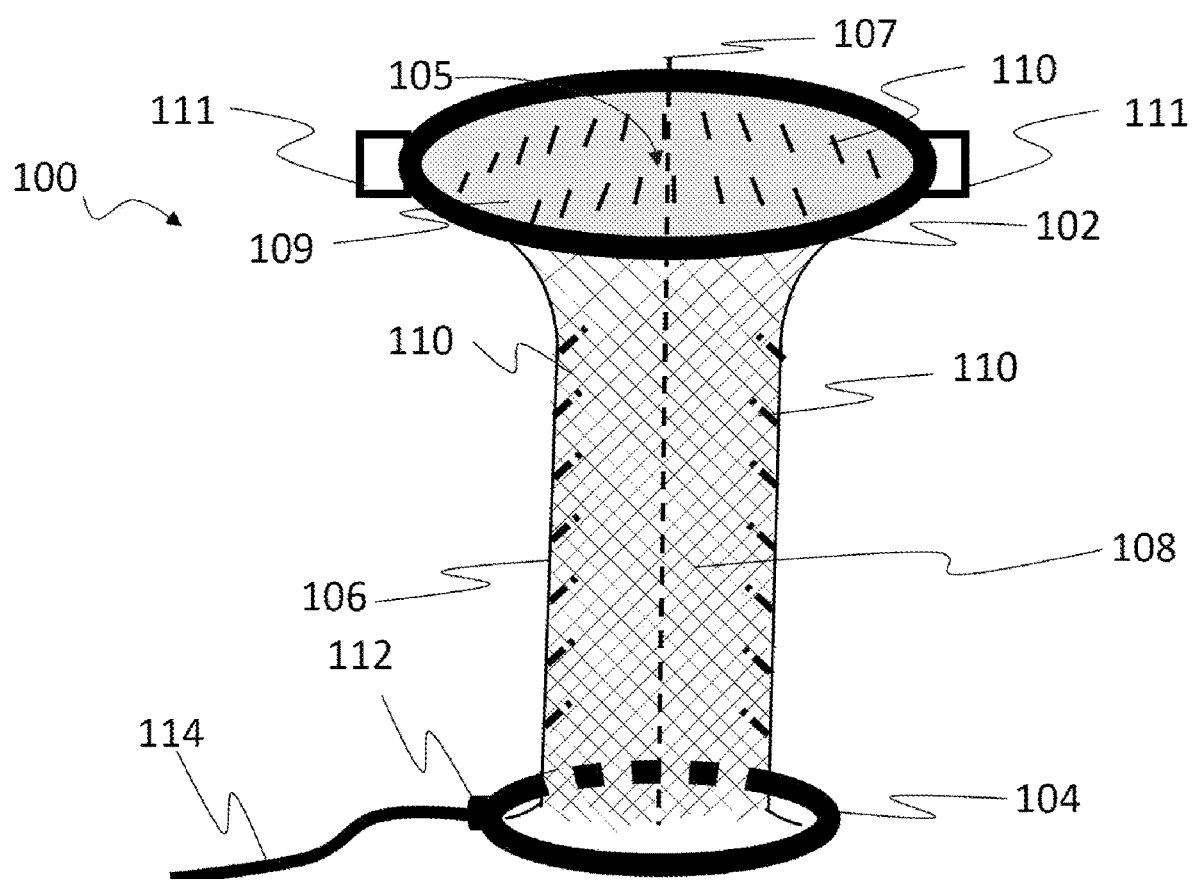
Figure 1C:
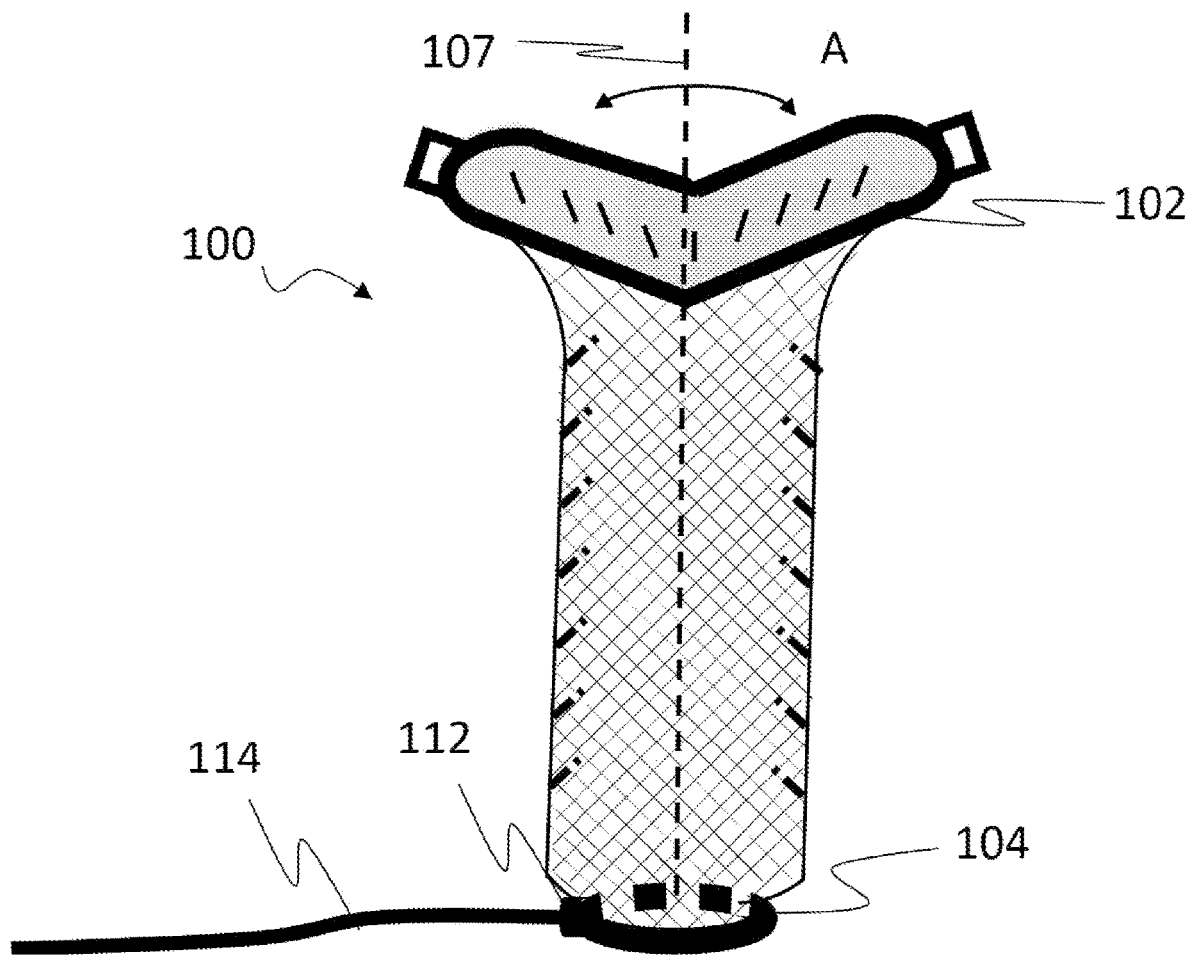

FIG. 1C, shows the mesh structure and the device in the contracted configuration. The foldable proximal ring 102 can fold and unfold along direction shown by the double headed arrow A, around a transverse axis perpendicular to the long axis 107 of the device. The foldable proximal ring 102 can contain hinges or like device allowing the ring to fold and unfold. FIG. 1A and FIG. 1B shows the ring 102 in unfolded configuration. FIG. 1C shows the folding of the ring 102. FIG. 1C also shows the distal opening 104 ring having a diameter smaller than the ring diameter in FIGS. 1A and 1B.

Referring to FIG. 1D, the device 100 inside a subject's body cavity is shown. The proximal opening 102 can be configured to be positioned proximal and external to an opening 118 in a subject's body wall 116. The device can be configured to secure a specimen 120 from the subject's body. The surface protrusions 110 can create a directionally resistant surface allowing specimen movement in the channel 105 in the overall direction shown by the arrow B, towards the proximal opening 102, but can substantially resist movement of the specimen in the opposite direction, towards the distal opening 104. 116, 118, 120 are not part of the device.

The surface protrusions can have similar structure, shape, size and arrangement as of the surface protrusions as discussed in US20170181767A1, which is incorporated herein in its entirety by reference. Referring to FIG. 2 side view of surface protrusions according to four embodiments are shown. Non-limiting shapes of the surface protrusions can include hair or needle FIG. 2A, wedge FIG. 2B, spike or angled spike FIG. 2C, and/or barb or hook 2D shaped. Device having the surface protrusions with a variety of shapes can be used.

The surface protrusions 110 can have a top edge or a catch edge 122 $a$-$d$ towards the proximal opening and a bottom edge or a slide edge 124 $a$-$d$ towards the distal opening. The top edge 122 $a$-$d$ can form an angle 126 $a$-$d$ with the surface 109 $a$-$d$, on which the protrusions are positioned, e.g. inner surface of the elongated body and/or the tubular mesh. The bottom edge 124 $a$-$d$ can form an angle 130 $a$-$d$ with the surface 109 $a$-$d$. The angle 126 $a$-$d$ can be 90° or less, or 5° to 90° or 15° to 90° or equal to any one of, or between any two of 15, 20, 25, 30, 35, 40, 45, 50, 55, 60, 65, 70, 75, 80, 85 and 90°. The angle 130 $a$-$d$ can be 90° or higher, or 100° to 170° or equal to any one of, or between any two of 100, 105, 110, 115, 120, 125, 130, 135, 140, 145, 150, 155, 160, 165 and 170°. The top edges 122 $a$-$d$ and bottom edges 124 $a$-$d$ can contact the inner surface 109 $a$-$d$ in a straight FIG. 2A-C and/or rounded FIG. 2 D fashion, and the angle 126 $a$-$d$ and 130 $a$-$d$ can be the angle the majority portion of the top 122 $a$-$d$ and bottom 124 $a$-$d$ edges respectively make with the surface 109 $a$-$d$. The surface protrusion 110 can be arranged in the inner surface 109 $a$-$d$ in suitable manner capable of making the surface 109 $a$-$d$ directionally resistant, as discussed above. The arrangement can be symmetric and/or asymmetric. Non-limiting arrangements of the surface protrusions on the surface 109 $a$-$d$ can include random arrangement, circular arrangements form circular bands of the surface, helical arrangement, zigzag arrangements, or any combinations thereof.

The surface protrusions can be present in the inner surface of the elongated body and/or the mesh structure at a density of at most, at least, or about 0.1, 1, 10, 100, 1000, 10,000, 100,000, 1000,000 protrusions per $mm^2$, including all values and ranges there between. The protrusion can have cross section parallel to the inner surface that is circular, elliptical, oblong, triangular, square, rectangular, rhomboid, trapezoid, diamond, or other geometric shape. In certain respect the wedge can have a pointed, straight, or curved edge. A curved edge can curve out from the wedge or in towards the wedge. The curve can be semicircular to elliptical (similar to a cheese grater). In a further aspect the edge is sharp so that it can penetrate the surface of a sample. In certain aspects the protrusion can have a height (see height 128 $a$-$d$ of FIG. 2 for an example) of 0.5, 5, 50, 100, 500 μm to 1, 2, 3, 4, 5 mm, including all values and ranges there between. The protrusion can have width or diameter (see width or diameter 132 $a$-$d$ of FIG. 5 for an example) of 0.1, 0.5, 5, 50, 100, 500 μm to 1, 2, 3, 4, 5 mm, including all values and ranges there between. In some aspects, the width or diameter can change or taper along the height, the length, or the height and the length of the protrusion. In certain respects the width or diameter refers to the cross section of the protrusion at the base, with various configurations changing width or diameter along the height of the protrusion, e.g., the protrusion can taper as one moves from base to tip or edge. In certain respects the protrusion or texture is molded, embossed, or etched onto or into the surface.

Figure 3A:
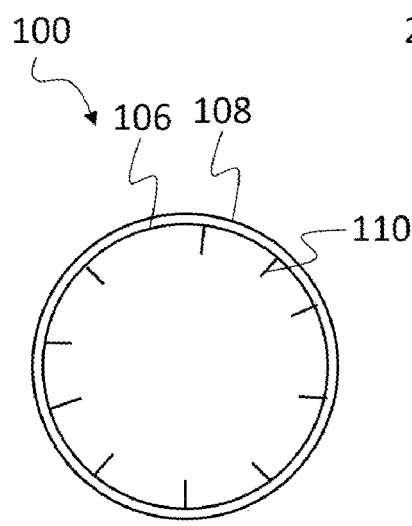
FIGS. 3A-C illustrate top view of cross-sections of devices according to three (3) embodiments are shown.
Figure 3B:
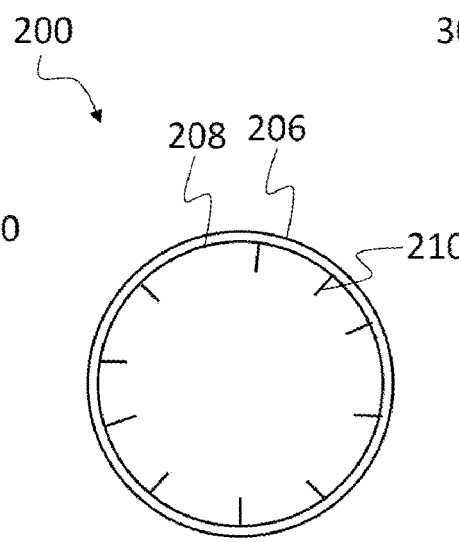
Figure 3C:
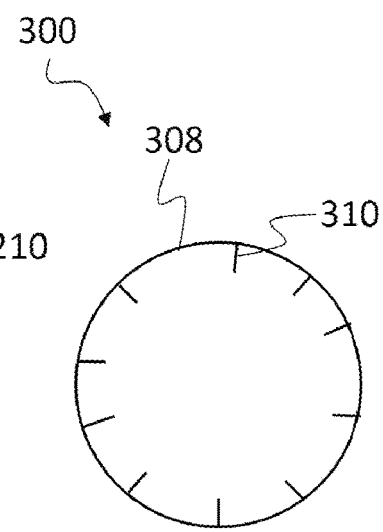

Although for device 100, the mesh structure 108 surrounds the elongated body 106, devices with the mesh structure surrounded by the elongated body or the elongated body incorporated into the mesh structure can readily be made. Referring to FIG. 3A a top view of a cross-section of the device 100 along a transverse plane perpendicular to axis 107 is shown. For device 100 the mesh structure 108 surrounds the elongated body 106 and the surface protrusions 110 are positioned on the inner surface of the elongated body. Referring to FIG. 3B a similar view of device 200 according to another embodiment, e.g. a top view of a cross-section of the device 200 along a transverse plane perpendicular to a long axis of the device 200 is shown. For device 200 the mesh structure 208 is surrounded by the elongated body 206 and the surface protrusions 210 are positioned on the inner surface of the mesh structure 208. Referring to FIG. 3C a similar view of a device 300 according to another embodiment, e.g. a top view of a cross-section of the device 300 along a transverse plane perpendicular to a long axis of the device 300 is shown. For device 300 the elongated body is incorporated into the mesh structure forming a single layer 308 and the surface protrusions 310 are positioned on the inner surface of 308.

The Sleeve can be configured to permit a specimen to be easily admitted within the sleeve or body. In certain embodiments, the constriction/dilation property of the sleeve or body can be the only property that is needed to allow the specimen to be easily admitted into the sleeve or body; however, other properties/designs can be included. In certain embodiments, the body or sleeve of the device is positioned in an outwardly curled, or rolled up position. When a specimen is introduced, the sleeve or body is then unfurled to cover the specimen. The sleeve or body can also have a distal bell shaped opening which is wider than the specimen and the proximal portion of the sleeve or body in order to permit easy access. In other aspects, a flexible ring can be positioned at the distal opening of the sleeve or body, configured to keep the access point to the sleeve or body dilated. The ring can be rubber or flexible thermoplastic that can bend or twist yet retain an open configuration during operation. In certain aspects, a closing mechanism is positioned proximal to the distal flexible ring.

During certain surgeries, skin of an abdominal wall of the patient is incised with a scalpel to form an incision for inserting a trocar into the abdominal cavity. A device as described herein can be deployed into the abdominal cavity via a trocar. The abdominal wall is formed of skin, subcutaneous tissue such as fat, and muscle tissue. During laparoscopic surgery, a pneumoperitoneum procedure is performed in which carbon dioxide gas is injected into the abdominal cavity to expand the abdominal cavity. The pneumoperitoneum procedure secures a space for treatment in the abdominal cavity. The device will span a body wall but it can also be fully deployed inside a body cavity. For deployment, the device will be used in conjunction with a deployment device called a delivery arm. In certain aspects, a device described herein can be directly inserted into a body cavity through an incision. In other aspects, the device described herein can be deployed through a trocar, typically a 5 mm, 12 mm, or 15 mm diameter trocar. In certain aspects the delivery arm will consist of an external sheath that keeps the sleeve device constricted to allow it to be delivered through the abdominal wall and into the abdominal cavity. The device when deployed inside body can contain specimens and provide for constriction of the specimen to prepare it for removal from the body cavity. In certain aspects, the device deployed inside the body cavity can have an opening on one end of the device to receive the specimen into the lumen. The opening can be sealed as described herein and the specimen readied for removal. In certain aspects, the device can be configured to be used with standard specimen retrieval systems (e.g., bags, retractors, morcellators, and the like).

The invention claimed is:

1. A specimen retrieval device comprising:
   a proximal opening configured to be positioned external to an opening in a body wall of a subject providing access to a body cavity of the subject;
   a distal opening at an end of the device opposite to the proximal opening, configured to be placed inside the body cavity of the subject;
   a flexible elongated body extending from the proximal opening to the distal opening, forming a specimen lumen along a long axis of the device;
   a contractible tubular interwoven mesh structure surrounding or surrounded by the flexible elongated body, or forming a single layer of the elongated body, and extending from the proximal opening to the distal opening, said contractable tubular interwoven mesh having a dilated configuration having a larger cross-sectional diameter and a contracted configuration having a smaller cross-sectional diameter as compared to the dilated configuration; and
   a plurality of surface protrusions positioned on an inner surface of the flexible elongated body and/or an inner surface of the contractable tubular mesh, said surface protrusions are configured to contact a specimen from the subject's body pulled into channel through the distal opening and is are configured to allow movement of the specimen through the channel towards the proximal opening but resist movement of the specimen towards the distal opening,
   wherein the dilated configuration, having a length of 0.01 to 5000 cm and an average cross-sectional diameter of 0.01 to 1500 cm and the contracted configuration, having a length of 0.07 to 7000 cm and an average cross-sectional diameter of 0.005 to 1200 cm are interchangeable through changing the device length.

2. The device of claim 1, wherein the surface protrusions project from the surface of the flexible elongated body and/or contractible tubular interwoven mesh structure at an angle of 90° or less relative to the surface.

3. The device of claim 1, wherein the surface protrusions project from the surface of the flexible elongated body and/or contractible tubular interwoven mesh structure at an angle of 90° or more relative to the surface.

4. The device of claim 1, wherein the protrusion is a wedge, a spike, a barb, a hook, or a loop.

5. The device of claim 1, wherein the distal opening is a flexible ring configured to hold a sleeve of the device in an open configuration to receive a specimen, the flexible ring configured with a mechanism to close the distal opening.

6. The device of claim 1, wherein the device comprises a cinch to close the distal opening to contain the specimen in a sleeve.

7. The device of claim 6, wherein the cinch is a purse-string cinch, drawstring, a snap, a clip, a zip lock, a slide lock, a folding hood, or a lock with interlocking edges.

8. The device of claim 1, wherein proximal end of the flexible elongated body forms a handle.

9. The device of claim 1, wherein the flexible elongated body comprises an impermeable material.

10. The device of claim 9, wherein the impermeable material is incorporated into the contractible tubular interwoven mesh or forms a separate layer.

11. The device of claim 1, wherein the contractible tubular interwoven mesh structure is made of fabric, plastic, suture material, metal or any combinations thereof.

12. The device of claim 1, wherein the contractible tubular interwoven mesh is a diamond shape weave, weave along the long axis, or a weave along the short axis.

13. The device of claim 1, wherein the plurality of surface protrusions are part of the mesh structure.

14. The device of claim 1, wherein the flexible elongated body further comprises a support structure parallel to the long axis of the body.

15. The device of claim 14, wherein the support structure is an inflatable pillar.

16. The device of claim 15, wherein the inflatable pillar is reversibly inflatable with a gas or fluid.

17. The device of claim 1, wherein the flexible elongated body further comprises a constriction structure perpendicular to the long axis of the body.

18. The device of claim 17, wherein the constriction structure is an inflatable ring or tube configured to constrict a specimen in the body lumen when inflated.

19. The device of claim 18, wherein the inflatable ring or tube is reversibly inflatable with a gas or fluid.

20. The device of claim 1, wherein the flexible elongated body comprises a distal section having a diameter that is greater than the proximal section of the sleeve.

* * * * *